United States Patent [19]
Kawakami et al.

[11] Patent Number: 5,401,472
[45] Date of Patent: Mar. 28, 1995

[54] APPARATUS FOR PRODUCING HIGH SURFACE AREA ACTIVE CARBON

[75] Inventors: Masahiro Kawakami, Nishinomiya; Toshiro Otowa, Gamo; Mamoru Shiraishi, Nishinomiya; Kazuhiko Higuchi, Kakogawa, all of Japan

[73] Assignee: Kansai Netsukagaku Kabushiki Kaisha, Amagasaki, Japan

[21] Appl. No.: 53,132

[22] Filed: Apr. 29, 1993

[30] Foreign Application Priority Data

May 1, 1992 [JP] Japan .................................. 4-140066

[51] Int. Cl.⁶ .................................................. C09C 1/44
[52] U.S. Cl. ................................. 422/151; 110/246; 422/150; 422/207; 422/168; 422/188; 422/237
[58] Field of Search ............... 422/198, 207, 208, 168, 422/187, 188, 268, 150–153, 237; 110/235, 246, 215; 502/427; 423/445, 461

[56] References Cited

U.S. PATENT DOCUMENTS

| | | | |
|---|---|---|---|
| 1,528,371 | 3/1925 | Gambel | 502/427 X |
| 3,835,064 | 9/1974 | Shinomiya et al. | 502/427 X |
| 4,288,408 | 9/1981 | Guth et al. | 422/151 X |
| 5,188,041 | 2/1993 | Noland et al. | 110/246 |

Primary Examiner—Amalia L. Santiago
Attorney, Agent, or Firm—Armstrong, Westerman, Hattori, McLeland & Naughton

[57] ABSTRACT

An apparatus for producing high surface area active carbons in a safe and commercially advantageous manner by the alkali metal hydroxide-based activation method is provided. Using pushers (9a–k), the apparatus circulates containers (C) along a container travel line (8) connecting the elements: material feeding section (1)→inlet side gas replacement chamber (2)→tunnel kiln (3)→cooling zone (4)→water injection chamber (5)→outlet side gas replacement chamber (6)→reaction mixture discharge port (7) to form a closed circuit. During the travel of the containers, a series of steps is performed, namely the steps of charging of the containers with raw materials (carbonaceous material and alkali metal hydroxide-water mixture), dehydration, activation of the carbonaceous material with the alkali metal hydroxide, cooling, water injection and discharge of the reaction mixture. The gas exhaustion system for the tunnel kiln (3) and water injection chamber (5) is provided with a water seal (10).

1 Claim, 3 Drawing Sheets

APPARATUS FOR PRODUCING HIGH SURFACE AREA ACTIVE CARBON

FIELD OF THE INVENTION

The present invention relates to an apparatus for commercial production of active carbon with a high surface area through activation of a carbonaceous material with an alkali-metal hydroxide.

BACKGROUND OF THE INVENTION

Active carbons with a BET specific surface area greater than 1,500 m$^2$/g, preferably greater than 2,000 m$^2$/g, are useful for various purposes, such as fractionation of hydrocarbons, purification of industrial gases, adsorptive removal of toxic gases, antipollution measures, liquid phase purification in food and chemical industries, water treatment, recovery and fractionation of liquid phases, catalysts or catalyst supports, electric double layer capacitors, and so on.

For producing such high surface area active carbons, the following potassium hydroxide activation process is disclosed in U.S. Pat. No. 4,082,694 (Japanese Patent Publication No. 62-61529; Japanese Kokai Tokkyo Koho No. 52-92894). In said process, a carbonaceous material comprising coal coke, petroleum coke or a mixture thereof is mixed with granular hydrous potassium hydroxide, the mixture is dehydrated by heating in a precalciner within a temperature range between about 315.6° C. (600° F.) and about 482.2° C. (900° F.) and the product of precalcination step is then heated in a calciner to a temperature between about 704.4° C. (1,300° F.) and about 982.2° C. (1,800° F.), whereby activation is effected to give active carbon with a high surface area greater than 2,300 m$^2$/g. An example is given there in which a rotary precalciner equipped with counter rotating auger was used as the precalciner. As regards the calciner, the specification mentions to the effect that an indirectly fired rotary calciner is preferred, without any further comment.

In U.S. Pat. No. 5,064,805 (Japanese Kokai Tokkyo Koho No. 02-97414), a method of producing high quality activated carbon is disclosed which uses coconut shell char as a carbonaceous material and potassium hydroxide hydrate as an activator and in which a mixture of these is heat-treated at a temperature conducive to activation. The apparatus used in the examples is a vertical calciner equipped with a stirrer, heating means and nitrogen inlet means.

PCT International Publication WO 91/12203 (International Application No. PCT/JP/00127) discloses a carbonaceous material with high electrostatic capacitance as prepared by heat-treating an activated carbon material at a temperature lower than 700° C. in an alkali metal hydroxide bath. The activated carbon material includes coconut shells, wood dust, coal, resins, etc. The alkali metal hydroxide is the hydroxide of sodium, potassium, lithium or the like. No apparatus is mentioned in the specification, however.

Japanese Kokai Tokkyo Koho No. 63-78514 discloses a double-layer capacitor comprising a polarizing electrode of activated carbon, which is prepared from a petroleum coke and has a large specific surface area, in combination with an electrolyte of an aqueous solution. The large specific surface area activated carbon is prepared by activation of the petroleum coke. However, the specification does not mention any apparatus for the production of such activated carbon.

Japanese Kokai Tokkyo Koho No. 03-294780 and No. 03-294781 disclose a material for conveying rails for an alkaline-atmosphere firing furnace and a material for a lining of an alkaline-atmosphere firing furnace, respectively. A pusher-type tunnel kiln is given as an example of the alkaline-atmosphere firing furnace. As shown in the examples, the alkaline-atmosphere firing furnace is, for example, a "fluorescent pigment which, upon heating, generates Na$_2$O, an alkali metal sulfide and so forth."

In U.S. Pat. No. 4,082,694 (Japanese Patent Publication No. 62-61529), a two-step process is disclosed which gives high surface area active carbons by the potassium hydroxide-based activation method using rotary calciners. However, this process still has certain problems, such as adhesion of the reaction mixture to the inside wall of the apparatus, possible sealing failure because of the presence of rotary members, and relatively poor heat economy because of being a two-step process. In particular, sealing failure may result in catching fire or explosion due to the product gas (hydrogen gas) or vaporized metallic potassium, hence it may become a fatal defect in the commercial practice of the process.

The vertical calciner used in U.S. Pat. No. 5,064,805 (Japanese Kokai Tokkyo Koho No. 02-97414) is operated batchwise and therefore is unacceptable from the commercial viewpoint although it can be used in laboratories.

The high surface area active carbons obtained by the processes disclosed in the above-cited references are very excellent in quality and therefore it is earnestly desired that they be made available on the market. Regrettably, however, any commercial-scale apparatus has not been developed as yet for stable production of said active carbons.

The carbonaceous material with high electrostatic capacitance disclosed in International Publication WO 91/12203 and the double-layer capacitor disclosed in Japanese Kokai Tokkyo Koho No. 63-78514 are nothing but an example of the applicability of the alkali metal hydroxide-based activation method. The firing furnaces disclosed in Japanese Kokai Tokkyo Koho No. 03-294780 and No. 03-294781 merely provide an example of the pusher-type tunnel kiln and remain within the scope of the background art.

Under these circumstances, it is a primary object of the invention to provide a safe and commercially advantageous apparatus for producing high surface area active carbons by the alkali metal hydroxide-based activation method.

SUMMARY OF THE INVENTION

The present invention provides an apparatus for the production of high surface area active carbons through activation of a carbonaceous material with an alkali metal hydroxide, which apparatus comprises a material feeding section (1) for feeding a carbonaceous material and an alkali metal hydroxide-water mixture to empty containers (C), an inlet side gas replacement chamber (2) disposed at the inlet of the tunnel kiln (3) mentioned below and capable of deaeration and inert gas replacement, a tunnel kiln (3) equipped with heating means and inert gas inlet means and enabling dehydration and activation of the carbonaceous material during the passage therethrough of the containers (C) after loading, a cooling zone (4) disposed at the outlet of said tunnel kiln (3) and equipped with cooling means and inert gas inlet means, a water injection chamber (5) disposed at the outlet of said cooling zone (4) and equipped with inert gas inlet means, an outlet side gas replacement chamber (6) disposed at the outlet of the water injection chamber (5) and capable of deaeration and inert gas replacement, a reaction mixture discharge port for discharging the reaction mixture from the containers (C), a container travel line (8) connecting the above constituents in the order of (1), (2), (3), (4), (5), (6) and (7) to form a closed circuit, pusher means (9a-k) for pushing the containers (C) so as to allow them to follow the container travel line (8) and water seal means (10) disposed in an exhaustion system for the gases from the tunnel kiln (3) and water injection chamber (5).

Figure 1:
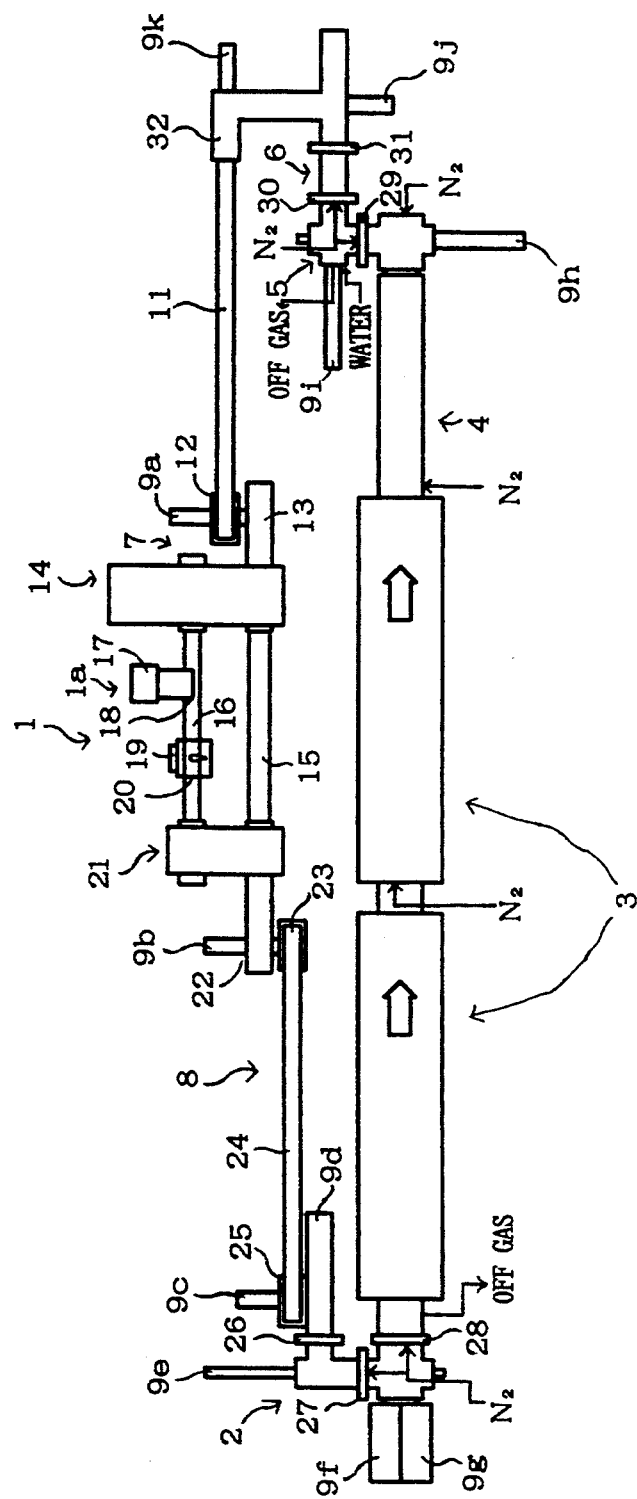
FIG. 1 is a plan view showing an example of the apparatus of the present invention.

In the figures, the reference numerals and letters are used to refer to the following: (1)—material feeding section; (1a)—carbonaceous material feeding port; (1b)—alkali (alkali metal hydroxide-water mixture) feeding port; (2)—inlet side gas replacement chamber; (3)—tunnel kiln; (4)—cooling zone; (5)—water injection chamber; (6)—outlet side gas replacement chamber; (7)—reaction mixture discharge port; (8)—container travel line; (9a-k)—pusher means; (9a), (9b), ..., and (9k), each—pusher; (10)—water seal means; (11)—outlet return conveyor; (12)—container push-in lifter; (13)—container-receiving lifter; (14)—separating section; (15)—bed plate/cover line conveyor; (16)—tray line conveyor; (17)—carbonaceous material feeding means; (18)—carbonaceous material feeding port positioning means; (19)—alkali feeding means; (20)—alkali feeding port positioning means; (21)—combining section; (22)—container transfer lifter; (23)—container push-out lifter; (24)—inlet return conveyor; (25)—inlet return lifter; (26) entrance door; (27) intermediate entrance door; (28)—entrance shutoff door; (29)—exit shutoff door; (30)—intermediate exit door; (31)—exit door; (32)—outlet return lifter; (33)—dissolution tank; (34)—washing water feeding means; (35)—buffer tank; (C)—container; ($C_1$)—tray; ($C_2$)—cover; ($C_3$)—bed plate.

DETAILED DESCRIPTION OF THE INVENTION

The apparatus of the invention is intended to produce high surface area active carbons through activation of a carbonaceous material with an alkali metal hydroxide and comprises a material feeding section (1), an inlet side gas replacement chamber (2), a tunnel kiln (3), a cooling zone (4), a water injection chamber (5), an outlet side gas replacement chamber (6), a reaction mixture discharge port (7), a container travel line (8) and pusher means (9a-k) as well as water seal means (10).

The material feeding section (1) charges empty containers (C) with a carbonaceous material and an alkali (alkali metal hydroxide-water mixture). The material feeding section (1) generally comprises a carbonaceous material feeding port (1a) and an alkali feeding port (1b). Each container may be charged first with the carbonaceous material and then with the alkali, or vice versa, or simultaneously with both.

The inlet side gas replacement chamber (2) is disposed at the inlet of the tunnel kiln (3) and constructed so that deaeration and inert gas replacement can be performed therein. Nitrogen gas is generally used as the inert gas.

The tunnel kiln (3) is equipped with heating means and inert gas inlet means and is intended to effect dehydration and activation of the carbonaceous material during the passage therethrough of each container (C) after loading. In this step, too, nitrogen gas is generally used as the inert gas. The heating means may be such a heating element as graphite heater, molybdenum heater, tungsten heater, metallic heater, EREMA heating element, KANTHAL SUPER, sheathed heater, or KERAMAX heating element. In certain instances, the fuel gas firing heating method is employable as well.

The cooling zone (4) is a zone for cooling the reaction mixture in each container that has passed through the tunnel kiln (3). Said zone is equipped with an inert gas inlet means and is disposed at the outlet of the tunnel kiln (3). It is dangerous to take out the reaction mixture heated to the activation temperature as such from the kiln and allow it to come into contact with air. In addition, it is necessary that the water injection in the following water injection chamber (5) should be conducted at a temperature not exceeding a certain limit. It is for these reasons that this cooling zone (4) is provided. The cooling is generally carried out in the manner of water cooling.

The water injection chamber (5) is a chamber in which water is poured over the reaction mixture in each container (C). Said chamber is disposed at the outlet of the cooling zone (4). An inert gas is introduced into this water injection chamber (5), too. The water injection treatment in the water injection chamber (5) further cools the reaction mixture and at the same time converts the alkali metal into the corresponding alkali metal hydroxide, bringing to perfection the safety measures for preventing catching fire or explosion.

The outlet side gas replacement chamber (6) is disposed at the outlet of the water injection chamber (5) and constructed so that deaeration and inert gas replacement can be performed therein. Nitrogen gas is generally used as the inert gas.

The reaction mixture discharge port (7) discharges the reaction mixture from each container (C) that has passed through the water injection chamber (5).

The container travel line (8) connects the constituent elements mentioned above in the order of (1), (2), (3), (4), (5), (6) and (7) to form a closed circuit and generally consists of rails. The container travel line (8) may be a single track one or, for increased productivity, a double track or four track one. The whole container travel line (8) is generally constituted by joining straight-line segments together.

The pusher means (9a-k) push and move each container (C) to allow the same to follow the container travel line (8). They are disposed at respective turning points in the container travel line.

The exhaust system for the gases from the tunnel kiln (3) and water injection chamber (5) is provided with the water seal means (10). The exhaust gases from the tunnel kiln (3) and water injection chamber (5) are released into the atmosphere through said water seal means (10).

The carbonaceous material to be used includes coconut shell char, coal, coal coke, petroleum coke, carbon black and the like and, further, coke dust deposited and collected in dust collectors or dry quenchers in coke plants. Among them, coconut shell char has a low sulfur content by nature and can readily be deprived of sulfur in the process of activation with potassium hydroxide, hence is very suited for the production of low sulfur content, high surface area active carbons. Coal, coal coke and petroleum coke are general-purpose carbonaceous materials and are suited for the production of active carbons for purposes other than use as catalysts which are liable to sulfur poisoning. Carbon black is suited for the production of high electric conductivity active carbons.

When the carbonaceous material has a grain size substantially not greater than 100 mesh, preferably a grain size substantially not greater than 200 mesh, active carbons having a very large surface area can be obtained. Carbonaceous materials which are coarser, or 10 to 100 mesh in grain size, may also be used.

The alkali metal hydroxide is potassium hydroxide, sodium hydroxide, lithium hydroxide, or a mixture of two or more of these. Among these, potassium hydroxide is particularly important. Sodium hydroxide is also important.

The blending ratio of the carbonaceous material to the alkali hydroxide is suitably within the range of 1:1 through 1:10 by weight, preferably 1:2 through 1:8 by weight. If the proportion of the alkali metal hydroxide is too small, the degree of activation will not be as high as desired, while the use of an excessively large excess of the alkali metal hydroxide will make the active carbon fragile.

The amount of water is suitably about 0.05 to 10 times, preferably 0.05 to 8 times, the amount of the alkali metal hydroxide. The concentration of the alkali metal hydroxide in the alkali metal hydroxide-water mixture should be adjusted such that said concentration can fall within such range. If the amount of coexisting water is too small, the operability of the process will become inferior because of the high melting point of the alkali metal hydroxide, while an excessively large amount of water will cause a decrease in the degree of activation of the carbonaceous material by the alkali metal hydroxide.

The first half of the tunnel kiln (3) where the dehydration reaction proceeds predominantly is operated at relatively low temperatures while the latter half where the activation reaction predominates is maintained at relatively high temperatures. Thus, for example, the temperature in the first half of the kiln is increased stepwise from about 100° C. to the activation temperature and, in the second half, the activation temperature is maintained. In most cases, the activation temperature is about 480° to 900° C., preferably about 600° to 750° C. A higher activation temperature tends to give active carbon with a higher surface area but, conversely, tends to produce disadvantages, for example a decrease in the yield of active carbon and restrictions on the material of the containers (C). On the contrary, a relatively low activation temperature tends to give a somewhat decreased surface area but improves the yield of active carbon and lightens the restrictions on the material of the containers (C).

After feeding of the carbonaceous material and alkali metal hyroxide-water mixture to each container (C), no particular stirring operation is required in the subsequent process including the step of heating in the tunnel kiln (3).

Each container (C) is suitably composed of a tray ($C_1$) and a cover ($C_2$). A cover ($C_2$) having a central hole is preferred since the hole can prevent possible foaming and spouting out of the contents in the container (C) during heating and facilitate the subsequent water injection procedure. The container (C) is preferably transferred by pushing a bed plate ($C_3$) carrying the container placed thereon by means of the pusher means ($9a-k$) already mentioned hereinabove.

In the reaction mixture discharge port (7), the cover ($C_2$) of the container (C) is removed and the tray ($C_1$) is then tilted or turned over for emptying out the reaction mixture therefrom. Since the reaction mixture has been sprayed with water in the water injection chamber (5), the emptying is easy.

The reaction mixture discharged in the reaction mixture discharge port (7) is submitted, via a dissolution tank, a buffer tank and so on, to a purification step. The purification step comprises an alkali washing step, a sieving step, an acid washing step, a dehydration step and so forth.

The tray ($C_1$) of the container (C) after discharge of the reaction mixture is subjected to washing with a jet of water, for instance. The tray ($C_1$) is then sent to the material feeding section (1) already mentioned hereinabove. After charging the tray ($C_1$) with the raw materials, the cover ($C_2$) is placed again on said tray, and the whole container is sent to the inlet side gas replacement chamber (2). The cover ($C_2$) may be washed or reused without washing.

The active carbons produced by using the apparatus of the invention have a high surface area and therefore can suitably be used for various purposes, for example fractionation of hydrocarbons, purification of industrial gases, adsorptive removal of toxic gases, anti-pollution measures, liquid phase purification in food and chemical industries, water treatment, recovery and fractionation of liquid phases, catalysts or catalyst supports, cells or batteries, electric double layer capacitors, analytical and pharmaceutical uses, and so forth.

In accordance with the invention, a series of steps including feeding of the raw materials (carbonaceous material and alkali metal hydroxide-water mixture), dehydration, activation of the carbonaceous material with the alkali metal hydroxide, cooling, water injection and discharge of the reaction mixture are conducted while each container (C) is circulated in the manner of material feeding section (1)→inlet side gas replacement chamber (2)→tunnel kiln (3)→cooling zone (4)→water injection chamber (5)→outlet side gas replacement chamber (6)→reaction mixture discharge port (7)→material feeding section (1)→. . . by the aid of the pusher means ($9a-k$).

The apparatus of the invention is equipped with water seal means (10). The water seal means (10) is indispensable for safety since said means not only prevents the atmospheric air from entering the tunnel kiln (3) and water injection chamber (5) but also captures the byproduct alkali metal vapor contained in the exhaust gases.

In addition, since deaeration and inert gas replacement are to be performed in the inlet side gas replacement chamber (2) as well as in the outlet side gas replacement chamber (6), the atmospheric air is prevented from entering the tunnel kiln (3) or cooling zone (4).

The doors before and behind the inlet side gas replacement chamber (2) and those before and behind the outlet side gas replacement chamber (6) are controlled such that all of them will not be opened simultaneously either automatically or manually. In case of a stoppage of electric power supply, each door should stop or move in the direction of closing.

In producing active carbons using the apparatus of the invention, the inside of the tunnel kiln (3) and cooling zone (4) is maintained under pressurized conditions (e.g. about ±100 mm $H_2O$) to avoid penetration of the outside air for extra safety.

When a carbonaceous material is activated using an alkali metal hydroxide, a gas mainly composed of hydrogen is generated and at the same time the corresponding alkali metal is produced. Although the hydrogen gas is diluted with the inert gas within the tunnel kiln (3), the hydrogen gas concentration, which amounts to about 20% by volume, still exceeds the lower explosion limit (4% by volume). Furthermore, when an alkali metal, for example potassium, reacts with water, the reaction $$K + H_2O \rightarrow KOH + \tfrac{1}{2}H_2$$

occurs violently with the production of fire. In the presence of oxygen, the hydrogen catches fire to induce explosion. Therefore, it is important for safety reasons that the inside of the tunnel kiln (3) and cooling zone (4) be maintained under pressurized conditions, as mentioned above.

The apparatus of the invention should be equipped with further safety devices, for example detectors for combustible gases and mechanisms preventing the pressure within the kiln from lowering.

The following examples are further illustrative of the present invention.

EXAMPLE 1

[Apparatus and flow]

As shown in FIG. 1, each container (C) delivered by the outlet return conveyor (11) is pushed into the container push-in lifter (12) by the container push-in pusher (9a) and travels via the container receiving lifter (13) to the separating section (14) where the tray ($C_1$) is separated from the bed plate ($C_3$) and cover ($C_2$). Said separating section (14) comprises the following: bed plate positioning means, bed plate/cover line lifter, tray take-out means, cover holding means, tray holding means, means for vertical tray movement, means for transverse tray movement, tray rotating means, and tray line lifter.

After departure from the separating section (14), the bed plate ($C_3$) and cover ($C_2$) travel on the bed plate/cover line conveyor (15) while the tray ($C_1$) travels on the tray line conveyor (16), during which the tray is packed with a carbonaceous material from the carbonaceous material feeding port (1a) and an alkali metal hydroxide-water mixture from the alkali (alkali metal hydroxide-water mixture) feeding port (1b). The reference number (17) indicates carbonaceous material feeding means, (18) carbonaceous material feeding port positioning means, (19) alkali feeding means, and (20) alkali feeding port positioning means.

The tray ($C_1$) and the bed plate ($C_3$) and cover ($C_2$), after traveling separately on the two tracks, as mentioned above, meet again in the combining section (21). This combining section comprises the following: bed plate positioning means, bed plate/cover line lifter, tray carry-in means, cover holding means, tray holding means, means for vertical tray movement, means for transverse tray movement, and tray line lifter.

After departure from the combining section (21), the container (C) charged with the raw materials is pushed into the container transfer lifter (22) by the container push-out pusher (9b), then travels, via the container push-out lifter (23), on the inlet return conveyor (24), is then transversely shifted onto the inlet return lifter (25) by the inlet transverse transfer pusher (9c), and further pushed into the inlet side gas replacement chamber (2) through the inlet door (26) by the inlet side gas replacement chamber pusher (9d).

The container (C) in the inlet side gas replacement chamber (2) is sent out through the intermediate inlet door (27) by the inlet side gas replacement chamber push-out pusher (9e) and then sent to the tunnel kiln (3) through the inlet shutoff door (28) by the main pusher (9f) or (9g). In the tunnel kiln (3), the contents of the container (C) are dehydrated and then the carbonaceous material is activated by the alkali metal hydroxide.

The container (C) that has passed through the tunnel kiln (3) enters the cooling zone (4), where said container is cooled. Then the container is sent to the water injection chamber (5) through the exit shutoff door (29) by the water injection chamber push-in pusher (9h).

The container (C) sprayed with water in the water injection chamber (5) is sent, via the intermediate exit door (30), to the outlet side gas replacement chamber (6) by the outlet side gas replacement push-in pusher (9i). The container (C) sent out from the outlet side gas replacement chamber (6) via the exit door (31) is transversely shifted by the outlet transverse transfer pusher (9j) and then sent, via the outlet return lifter (32), to the outlet return conveyor (11) mentioned hereinabove by the outlet return pusher (9k).

Figure 2:
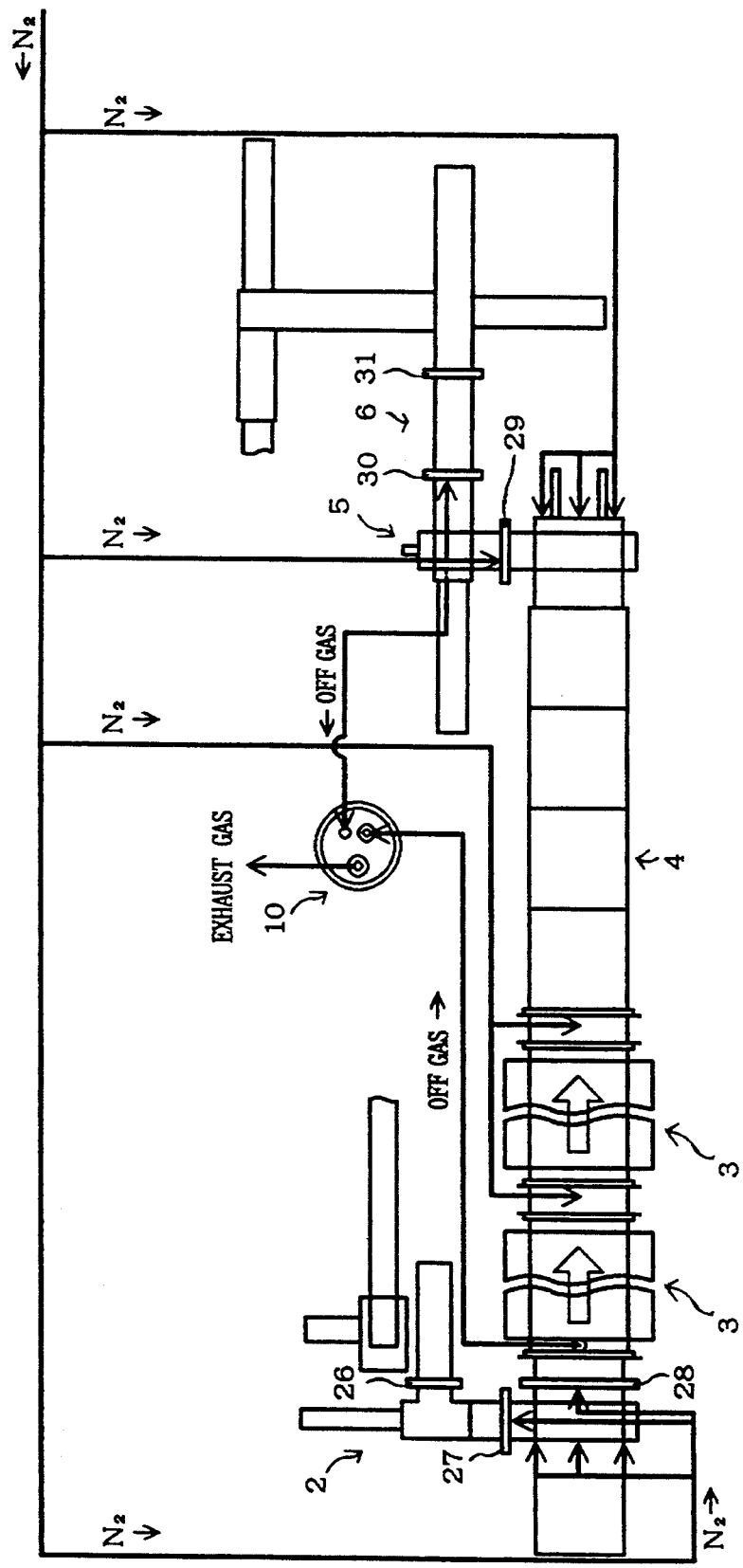
FIG. 2 is a schematic representation of an example of the inert gas feeding system and of the exhaust system.

As shown in FIG. 2, nitrogen gas, taken as an example of the inert gas, is fed to the following: intermediate entrance door (27), entrance shutoff door (28), space between these doors, middle of tunnel kiln (3), boundary portion between tunnel kiln (3) and cooling zone (4), behind of cooling zone (4), exit shutoff door (29) and intermediate exit door (30). Nitrogen gas also enters the inlet side gas replacement chamber (2) via the entrance shutoff door (28). It further flows into the outlet side gas replacement chamber (6) via the intermediate exit door (30).

The exhaust gases from the tunnel kiln (3) and water injection chamber (5) are collected in a watersealed tank, which is an example of the water seal means (10), bubbled into water and then discharged into the outside air. The combined exhaust gases are disposed of by combustion, or sent to another exhaust line in the factory, or used as a fuel or a raw material chemical.

Figure 3:
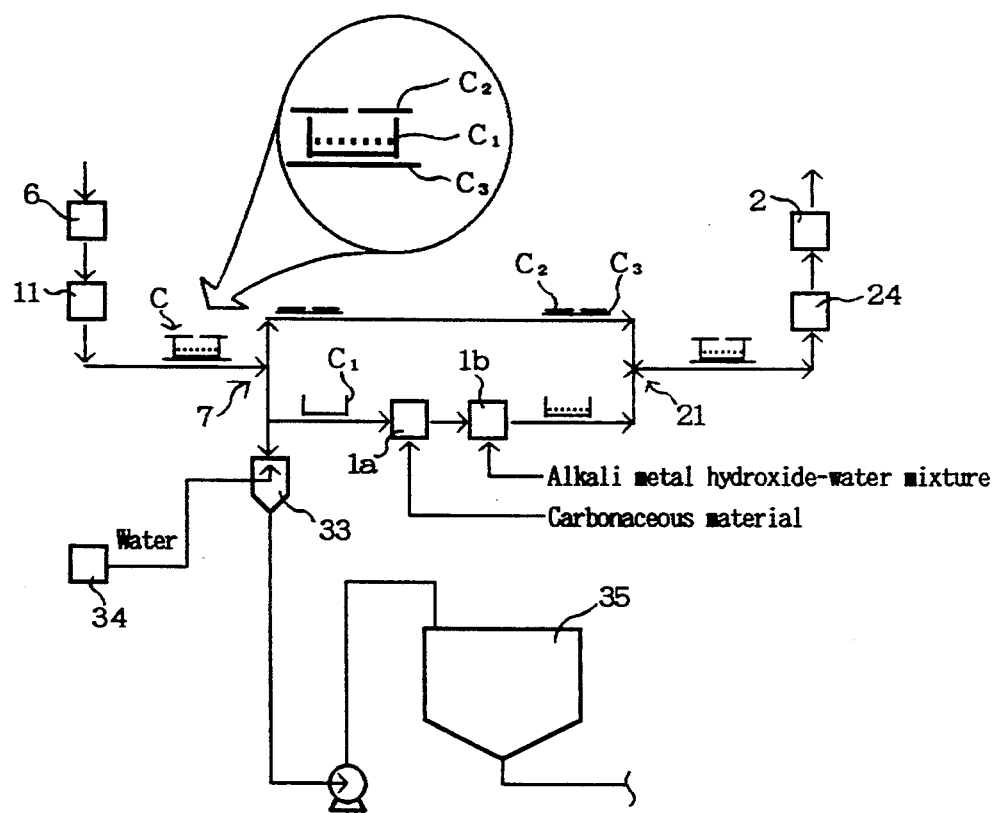
FIG. 3 is a flowchart showing an example of the material feeding step and of the reaction mixture discharge step.

In FIG. 3 (the right and left being inverse as compared with FIG. 1), the container (C) is composed of the tray ($C_1$), cover ($C_2$) and bed plate ($C_3$). The container delivered via the outlet side gas replacement chamber (6) and outlet return conveyor (11) is separated into the tray ($C_1$) and the bed plate ($C_3$) and cover ($C_2$) in the separating section (21), as mentioned hereinabove, and the reaction mixture in the tray ($C_1$) is discharged into the dissolution tank (33). On this occasion, the tray ($C_1$) is washed by means of the washing water feeding means (34) and the washings are also sent to the dissolution tank (33).

The mixture in the dissolution tank (33) is sent to a purification step (not shown in the figure) via the buffer tank (35).

The tray ($C_1$), now empty, is again charged with the carbonaceous material and alkali metal hydroxide-water mixture and, after subsequent joining with the cover ($C_2$) and bed plate ($C_3$) in the combining section (21), it is sent to the inlet return conveyor (24) and to the inlet side gas replacement chamber (2).

PRODUCTION EXAMPLE 1

An apparatus as shown in the figure was used. The sum of the whole rotary kiln (3) length and the cooling zone (4) length was 19.6 meters. The total retention time in the tunnel kiln (3) and cooling zone (4) was 9.5 hours. The maximum kiln inside temperature was 750° C.

Active carbon was produced using coconut shell char (made in Phillippine; water content 3%, total sulfur concentration about 200 ppm) passing a 400-mesh sieve as the carbonaceous material and granular potassium hydroxide with a water content of 15% by weight as the alkali metal hydroxide-water mixture.

The thus-obtained active carbon was evaluated in terms of yield, sulfur content, typical physical characteristics and adsorbency, as follows:

| | |
|---|---|
| Active carbon yield | 60% |
| Total sulfur | 86 ppm |
| Bulk density | 0.30 |
| BET specific surface area | 2680 $m^2/g$ |
| Total micropore volume | 1.68 ml/g |
| Benzene adsorption | 150% |

Various determinations were made under the following conditions.

The yield of active carbon is the value for the product dried at 115° C.

The total sulfur was determined by the combustion method (JIS M 8813).

The bulk density was measured by placing 10 g of the sample in a 100-ml graduated cylinder, shaking it well and making the determination.

The BET specific surface area was determined by BET plotting (multipoint method) within the range of $P/Po=0.006$ to 0.1.

The total micropore volume was determined from the amount of nitrogen adsorbed within the range of $P/Po=0$ to 0.931 at the temperature of liquid nitrogen.

The amount of benzene adsorbed is the value calculated from the saturation amount of adsorption when a benzene-saturated water vapor (12.5%) at 25° C. is diluted 10-fold and passed (JIS K 1470).

PRODUCTION EXAMPLE 2

An apparatus as shown in FIG. 1 was used, in which the sum of the total tunnel kiln (3) length and the cooling zone (4) length was 19.6 meters. The retention time in the tunnel kiln (3) and cooling zone (4) was 9.5 hours and the maximum kiln temperature was 730° C. Petroleum coke was used as the carbonaceous material and a 10% (by weight) aqueous solution of potassium hydroxide as the aqueous alkali metal hydroxide solution.

In this example, active carbon with a BET specific surface area of 3,100 $m^2/g$ was obtained in 55% yield.

In the practice of the invention, the procedural operation on the whole can be regarded as being continuous although the operation is batchwise for each individual container (C). Therefore, the process is comparable in productivity to continuous processes. Moreover, the problems (adhesion of the reaction mixture to the apparatus inside wall, rotary element sealing, risk of fire or explosion due to the gas produced and/or the by-product alkali metal vapor) encountered by the two-step apparatus using a rotary precalciner and a calciner are solved all at once.

Thus the present invention provides a system capable of mass production while retaining the advantageous features of the small unit size production comprising weighing the raw materials on an individual container (C) scale, followed by the steps of reaction, cooling and discharge. Considering the safety features that the conventional large-size apparatus for handling large-scale raw materials have failed to possess, said system is important for commercial scale production of high surface area active carbons.

In addition, in the apparatus of the invention, water seal means (10) are provided to prevent invasion of the atmospheric air and at the same time capture the by-product alkali metal vapor contained in the exhaust gas. Furthermore, vacuum deaeration and inert gas replacement are performed in the inlet side gas replacement chamber (2) and outlet side gas replacement chamber (6), so that the safety measures of the apparatus can attain a highest perfection.

The invention thus makes it possible to produce high surface area active carbons in a commercially advantageous manner by the alkali metal hydroxide-based activation method.

What is claimed is:

1. An apparatus for the production of active carbon through activation of a carbonaceous material with an alkali metal hydroxide which comprises a container conveying means connecting, in the order recited, a material feeding means, an inlet side gas replacement chamber, a tunnel kiln, a cooling means, a water injection chamber, an outlet side gas replacement chamber, and a reaction mixture discharge means, the material feeding means being connected to the reaction mixture discharge means to form a closed circuit, the material feeding means for feeding a carbonaceous material and an alkali metal hydroxide-water mixture to empty containers, the inlet side gas replacement chamber disposed at the inlet of the tunnel kiln and capable of deaeration and supplying inert gas, the tunnel kiln equipped with heating means and inert gas inlet means and enabling dehydration and activation of the carbonaceous material during the passage therethrough of the containers after loading, the cooling means disposed at the outlet of said tunnel kiln and equipped with cooling means and inert gas inlet means, the water injection chamber disposed at the outlet of said cooling zone and equipped with a water injector and an inert gas inlet means, the outlet side gas replacement chamber disposed at the outlet of the water injection chamber and capable of deaeration and supplying inert gas, the reaction mixture discharge means for discharging the reaction mixture from the containers, pusher means for pushing the containers so as to allow the containers to follow the container conveying means and water seal means for releasing the gases from the tunnel kiln and water injection chamber.

* * * * *